United States Patent
Xu et al.

(10) Patent No.: US 12,000,757 B2
(45) Date of Patent: Jun. 4, 2024

(54) METHOD AND SYSTEM FOR LEAKAGE STATUS EVALUATION AND LEAKS LOCATION OF SOLID WASTE LAND DISPOSAL FACILITY

(71) Applicant: CHINESE RESEARCH ACADEMY OF ENVIRONMENTAL SCIENCES, Beijing (CN)

(72) Inventors: Ya Xu, Beijing (CN); Yuqiang Liu, Beijing (CN); Jingcai Liu, Beijing (CN); Guangyuan Yao, Beijing (CN); Kaida Zheng, Beijing (CN); Changxin Nai, Beijing (CN); Lu Dong, Beijing (CN); Qifei Huang, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 364 days.

(21) Appl. No.: 17/370,064

(22) Filed: Jul. 8, 2021

(65) Prior Publication Data
US 2022/0011191 A1    Jan. 13, 2022

(30) Foreign Application Priority Data

Jul. 10, 2020 (CN) .................. 202010663509.X

(51) Int. Cl.
*G01V 3/00* (2006.01)
*B09B 5/00* (2006.01)
(Continued)

(52) U.S. Cl.
CPC ............. *G01M 3/18* (2013.01); *B09B 5/00* (2013.01); *G01M 3/40* (2013.01); *G01V 3/083* (2013.01);
(Continued)

(58) Field of Classification Search
CPC .......... G01M 3/18; G01M 3/40; G01M 99/00; B09B 5/00; B09B 1/00; G01V 3/12;
(Continued)

(56) References Cited

U.S. PATENT DOCUMENTS

| 2002/0028109 A1* | 3/2002 | Rhee | .............. G01M 3/40 |
| | | | 405/129.95 |
| 2004/0218980 A1* | 11/2004 | Richardson | ........... E02D 31/006 |
| | | | 405/129.25 |

(Continued)

FOREIGN PATENT DOCUMENTS

| CN | 2662240 Y | 12/2004 |
| CN | 102889967 A | 1/2013 |

(Continued)

OTHER PUBLICATIONS

Chen Zhang et al., "Landfill Real Time Leakage Detection System Based on Subarea Multipoint Power Supply" Environmental Science & Technology, vol. 35, No. 11, 2012.
(Continued)

*Primary Examiner* — Raul J Rios Russo
(74) *Attorney, Agent, or Firm* — Oliff PLC

(57) ABSTRACT

A method and system for leakage status evaluation and leaks location of a solid waste land disposal facility. The method includes: arranging an off-site emitting electrode for the solid waste land disposal facility, and arranging a plurality of intra-site receiving electrodes on a solid waste pile surface in a grid shape; selecting a power supply to collect a current value between the off-site emitting electrode and each of the intra-site receiving electrodes respectively, and determining a maximum current value point Mn of the solid waste pile surface and a maximum current value An; selecting an off-site point So2, and measuring a current value between the off-site emitting electrode and the point So2 as a reference current Ab under the same power supply con-
(Continued)

dition; and determining a leakage status of the solid waste land disposal facility based on a ratio of the maximum current value An to the reference current Ab.

9 Claims, 3 Drawing Sheets

(51) Int. Cl.
    *G01M 3/18*     (2006.01)
    *G01M 3/40*     (2006.01)
    *G01V 3/08*     (2006.01)
    *G01V 3/12*     (2006.01)
    *G01V 3/28*     (2006.01)
    *G01S 13/02*     (2006.01)
    *G01S 13/88*     (2006.01)

(52) U.S. Cl.
    CPC .................. *G01V 3/12* (2013.01); *G01V 3/28* (2013.01); *G01S 13/0209* (2013.01); *G01S 13/88* (2013.01); *G01S 13/885* (2013.01)

(58) Field of Classification Search
    CPC ........ G01V 3/083; G01V 3/28; G01S 13/885; G01S 13/88; G01S 13/0209
    USPC ......................................................... 324/332
    See application file for complete search history.

(56) References Cited

U.S. PATENT DOCUMENTS

2012/0297868 A1* 11/2012 Elkins ..................... B09B 1/00
                                                                   73/152.31
2019/0056287 A1* 2/2019 Gao ..................... G01N 27/205

FOREIGN PATENT DOCUMENTS

| | | |
|---|---|---|
| CN | 107860528 A | 3/2018 |
| CN | 109839250 A | 6/2019 |
| CN | 109839419 A | 6/2019 |
| CN | 110888171 A | 3/2020 |
| IN | 101446566 A | 6/2009 |
| JP | H11-99369 A | 4/1999 |
| JP | 2018-205165 A | 12/2018 |

OTHER PUBLICATIONS

Shoa-peng Guan et al., "Affecting Factors of Electrical Leakage Detection Method for Double-liner Landfill" Environmental Science & Technology, vol. 33, No. 1, 2010.

* cited by examiner

METHOD AND SYSTEM FOR LEAKAGE STATUS EVALUATION AND LEAKS LOCATION OF SOLID WASTE LAND DISPOSAL FACILITY

BACKGROUND

Technical Field

The present invention relates to the technical field of harmless disposal of solid waste, and in particular, to a method and a system for leakage status evaluation and leaks location of a solid waste land disposal facility.

Related Art

The description in this section merely provides background information related to the present invention and does not necessarily constitute the prior art.

Land disposal facilities are the main means of harmless disposal of solid waste. The number of land disposal facilities is large, and is still growing continuously at present. A solid waste land disposal facility is a major groundwater pollution source, and the leachate produced in the solid waste land disposal process contains high concentrations of organic and inorganic pollutants, which have great consequences once entering soil and groundwater environments. An artificial leakage prevention system is an important engineering barrier to prevent and control the groundwater pollution, but the leakage prevention system may be damaged, and there is still a risk of leakage after the leakage prevention system is put into operation.

Therefore, quickly detecting the leakage of the solid waste land disposal facility after operation is of great significance to evaluate the damage and leakage severity of an impermeable layer and to further carry out the risk management and control by hierarchical classification according to different severity.

At present, there are two technologies for carrying out integrity detection and leaks location on an impermeable layer of a solid waste land disposal facility: a dipole method and an electrode grid method. The dipole method is only suitable for the situation that the total thickness of a medium (garbage and discharge guiding cobbles) above the impermeable layer is not more than 60 cm. The electrode grid method needs to lay detection electrodes at the bottom of a reservoir in advance during the construction of the solid waste land disposal facility, real-time on-line leakage monitoring and leaks location can be implemented by detecting the change of the resistivity characteristics of a medium at the bottom of the reservoir (the resistivity is reduced due to leachate leakage after the impermeable layer is damaged), although the electrode grid method has no requirement on the thickness of the medium above the impermeable layer, the detection electrodes must be mounted before the impermeable layer of the solid waste land disposal facility is laid, and thus the electrode grid method is not suitable for many solid waste land disposal facilities already in operation.

SUMMARY

To this end, the present invention provides a method and a system for leakage status evaluation and leaks location of a solid waste land disposal facility. A large number of detection electrodes are laid on a solid waste pile surface according to a rule, a high-voltage excitation signal is input to a solid landfill region through a high-voltage signal source, the detection electrodes collect intra-site current data and off-site current data simultaneously, and an intra-site current and an off-site current are compared to determine whether there is a leakage in the landfill region, and to determine the size and position of the leakage.

According to a first aspect of embodiments of the present invention, provided is a method for leakage status evaluation and leaks location of a solid waste land disposal facility, including:

arranging an off-site emitting electrode for the solid waste land disposal facility, and arranging a plurality of intra-site receiving electrodes on a solid waste pile surface in a grid shape;

selecting a power supply to supply power, collecting a current value between the off-site emitting electrode and each of the intra-site receiving electrodes respectively, and determining a maximum current value point Mn of the solid waste pile surface and a maximum current value An;

selecting an off-site point So2, and measuring a current value between the off-site emitting electrode and the point So2 as a reference current Ab under the same power supply condition; and determining a leakage status of the solid waste land disposal facility based on a ratio of the maximum current value An to the reference current Ab.

According to a second aspect of the embodiments of the present invention, provided is a system for leakage status evaluation and leaks location of a solid waste land disposal facility, including:

an off-site emitting electrode, arranged for the solid waste land disposal facility, and a plurality of intra-site receiving electrodes, arranged on a solid waste pile surface according to a grid-shaped structure;

a power supply, configured to supply power;

a data collection module, configured to collect a current value between the off-site emitting electrode and each of the intra-site receiving electrodes respectively, and determine a maximum current value point Mn of the solid waste pile surface and a maximum current value An;

a data measurement module, configured to select an off-site point So2, and measure a current value between the off-site emitting electrode and the point So2 as a reference current Ab under the same power supply condition; and a data processing module, configured to determine a leakage status of the solid waste land disposal facility based on a ratio of the maximum current value An to the reference current Ab.

According to a third aspect of the embodiments of the present invention, provided is a terminal device, including: a processor configured to implement a plurality of instructions, and a computer readable storage medium configured to store the plurality of instructions. The instructions are adapted to be loaded by the processor and to perform the above method for leakage status evaluation and leaks location of a solid waste land disposal facility.

According to a fourth aspect of the embodiments of the present invention, provided is a computer readable storage medium, having a plurality of instructions stored therein. The instructions are adapted to be loaded by a processor of a terminal device and to perform the above method for leakage status evaluation and leaks location of a solid waste land disposal facility.

Compared with the prior art, the present invention has the following beneficial effects.

(1) According to the present invention, a leakage status is quantitatively evaluated for the first time, and meanwhile an evaluation effect is universal, so that site leakage statuses under different conditions in different regions of the country are conveniently compared.

(2) According to the present invention, the interference of a site background on the evaluation result is eliminated by normalizing a conductivity difference between a shortest current path in a disposal site and an off-site background.

(3) According to the present invention, the shortest current path is tracked through a maximum current value, the magnitude of an off-site background current is determined by determining the shortest current path (distance) and a current direction, and it is ensured that the background current can reflect the site electrical characteristics except "electrical differences caused by leakage and leachate."

(4) According to the present invention, the maximum current value is positioned step by step from a coarse spacing to a fine spacing in a dynamic dot distribution mode. A large number of electrodes required to be arranged in place in one time are effectively reduced, and meanwhile the accuracy of the maximum current position is guaranteed.

(5) According to the method of the present invention, the detection electrode does not need to be mounted before the impermeable layer of the solid waste land disposal facility is laid. The method is still suitable for the solid waste land disposal facility already in operation, is not affected by regional differences, and can be adapted to almost any site and region.

The advantages of additional aspects of the present invention will be set forth in part in the description below, parts of which will become apparent from the description below, or will be understood by the practice of the present invention.

DETAILED DESCRIPTION

It should be noted that, the following detailed descriptions are all exemplary, and are intended to provide further descriptions of this application. Unless otherwise specified, all technical and scientific terms used in the present invention have the same meaning as commonly understood by a person of ordinary skill in the art to which this application belongs.

It should be noted that terms used herein are only for describing specific implementations and are not intended to limit exemplary implementations according to this application. As used herein, the singular forms are intended to include the plural forms as well, unless the context clearly dictates otherwise. Moreover, the terms "include" and "contain" and any other variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The embodiments in the present invention and features in the embodiments may be mutually combined in case that no conflict occurs.

Embodiment 1

According to the embodiment of the present invention, a method for leakage status evaluation and leaks location of a solid waste land disposal facility is provided. The method includes the following steps:

Step S101: An off-site emitting electrode is arranged for the solid waste land disposal facility, and a plurality of intra-site receiving electrodes are arranged on a solid waste pile surface in a grid shape.

Specifically, one off-site emitting electrode is arranged for the solid waste land disposal facility, and a plurality of intra-site (solid waste pile surface) receiving electrodes are arranged in a grid shape. In the present embodiment, the grid-shaped distribution of the intra-site electrodes is $$\begin{bmatrix} S_{11} & S_{12} & \ldots & S_{1j} \\ S_{21} & S_{22} & \ldots & S_{2j} \\ \vdots & \vdots & \vdots & \vdots \\ S_{i1} & S_{i2} & \ldots & S_{ij} \end{bmatrix}.$$

Of course, a person skilled in the art would be able to select the number and arrangement of electrodes according to practical requirements.

Step S102: A power supply is selected to supply power, a current value between the off-site emitting electrode and each of the intra-site receiving electrodes is collected respectively, and a maximum current value point Mn of the solid waste pile surface and a maximum current value An are determined.

Figure 1:
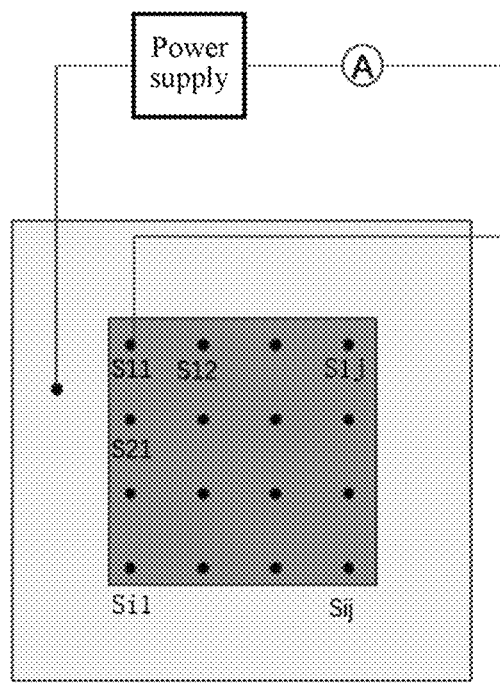
FIG. 1 is a schematic diagram of measuring a current between an intra-site electrode and an off-site electrode according to an embodiment of the present invention.

Specifically, referring to FIG. 1, there is a total of i×j intra-site receiving electrodes which are powered by using a high-voltage DC power supply. When two ends of the power supply are connected to an off-site electrode and an intra-site electrode s11 respectively, a current I11 is collected. Then, the connection between the power supply and the off-site electrode is kept fixed, the other end is connected to s12, s13, s1j, s21, s22, . . . , and sij in sequence, and current values of the other receiving electrodes are collected.

Step S103: The i×j intra-site electrodes are positioned by using a GPS to obtain x and y coordinates, current values of i×j points are interpolated by using spatial interpolation software (e.g., arcgis or surfer) to obtain a plane contour map of the current values, and a maximum current value point AMAX1 and xy coordinates thereof are determined according to the plane contour map of the current.

Step S104: Receiving electrodes are arranged for the second time in a region where the maximum current value point AMAX1 is located, and the grid spacing is reduced by several times based on the spacing in step S101.

A current value is collected according to the current collection method in step S102, a current contour map is drawn, and a maximum current value point AMAX2 and xy coordinates thereof are determined.

Whether a distance between the point AMAX1 and the point AMAX2 is smaller than a set value (e.g., the set value is 1 m in the present embodiment) is judged by comparison. If so, a final maximum current value An is recorded. Otherwise, receiving electrodes are further arranged in refined grids in a region of the maximum current value point AMAX2 determined in the previous step, and coordinates of AMAX3 are determined. A distance between AMAX3 and AMAX2 is compared, and the process stops when the distance is less than 1 m. Otherwise, receiving electrodes are continuously arranged in refined grids in a region where AMAX3 is located, and so on, until a distance between AMAXn and AMAXn−1 is smaller than the set value.

The maximum current value An and the maximum current value point AMAXn at this moment are recorded.

Step S105: An off-site point So2 is selected, and a current value between the off-site emitting electrode and the point So2 is measured as a reference current Ab under the same power supply condition.

Figure 2:
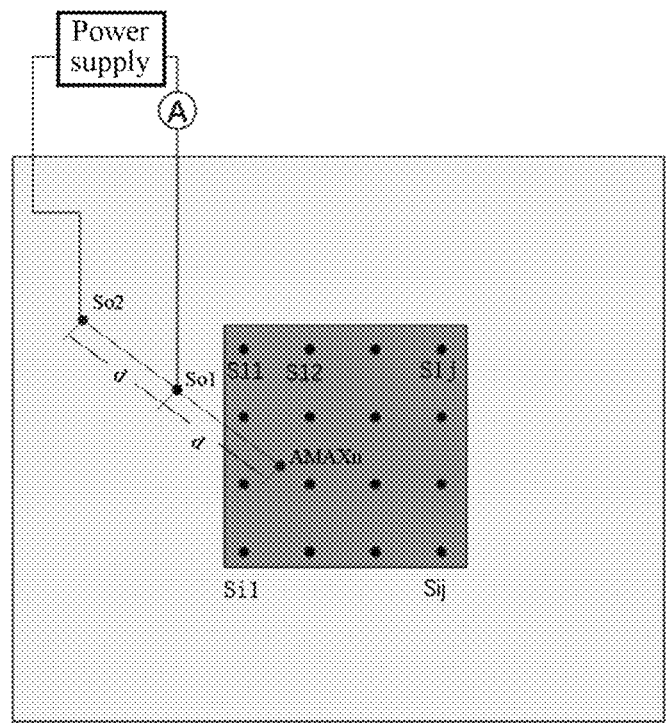
FIG. 2 is a schematic diagram of measuring a reference current according to an embodiment of the present invention.

Specifically, a horizontal distance d between AMAXn and an off-site emitting electrode So1 is measured by using the GPS (or other measurement tools). Referring to FIG. 2, an off-site point So2 is selected for a disposal facility with a distance d, a connecting line between So2 and So1 and a connecting line between So2, So1 and AMAXn are in the same straight line, two ends of the power supply are connected to So1 and So2 respectively under the same high-voltage DC power supply condition, and the current value after power supplying is measured as a reference current value Ab.

Step S106: A leakage status of the solid waste land disposal facility is determined based on a ratio of the maximum current value An to the reference current Ab.

Specifically, a leakage comprehensive index k is obtained by calculation according to the following formula:

$$k = \frac{A_n}{A_b}$$

A smaller k indicates a better integrity of an impermeable layer, and if k is approximate to 0, it indicates that there is substantially no leakage. On the contrary, a larger k indicates a more serious damage and leakage of the impermeable layer. When k is greater than 1, it indicates that the impermeable layer is damaged and the damage has resulted in a very serious leachate leakage.

The damage position of the impermeable layer may be determined according to a position of the maximum current value point AMAXn. The position of the maximum current value point AMAXn is a leakage position.

Embodiment 2

According to the embodiment of the present invention, a system for leakage status evaluation and leaks location of a solid waste land disposal facility is further provided. The system includes the following components:

(1) An off-site emitting electrode, arranged for the solid waste land disposal facility, and a plurality of intra-site receiving electrodes, arranged on a solid waste pile surface according to a grid-shaped structure.

Figure 3:
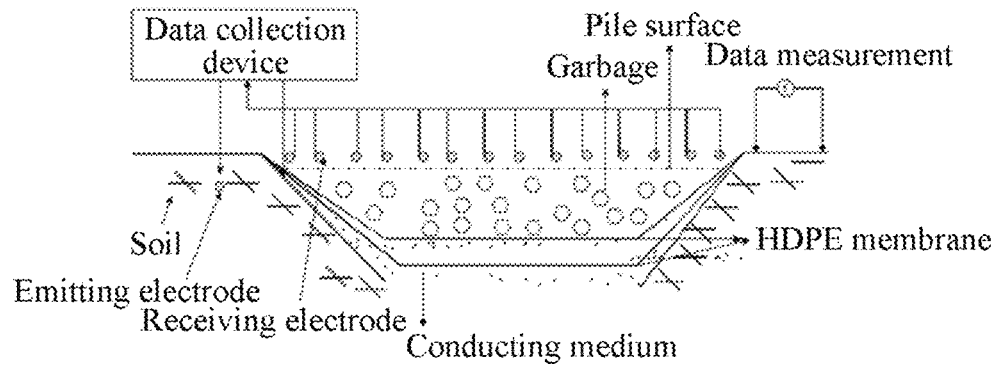
FIG. 3 is a schematic diagram of a system for leakage status evaluation and leaks location of a solid waste land disposal facility according to an embodiment of the present invention.
Figure 4:
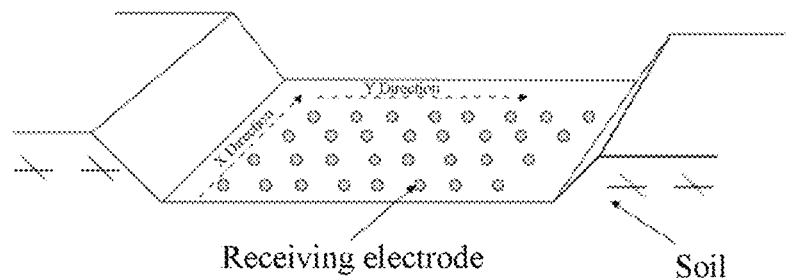
FIG. 4 is a schematic diagram of arrangement of intra-site receiving electrodes on a solid waste pile surface according to an embodiment of the present invention.

Specifically, referring to FIG. 3, in the early days, solid waste was landfilled without laying sensors at the bottom of a reservoir, and existing methods of determining a leakage position through sensors at the bottom of the reservoir were ineffective when leakages occurred at these sites. In the present embodiment, a plurality of receiving electrodes are laid on a solid waste pile surface according to a set rule. FIG. 4 shows a schematic diagram of arrangement of receiving electrodes. A high-voltage excitation signal is input to a solid landfill region through a high-voltage signal source, and current data of each receiving electrode is collected simultaneously.

(2) A power supply, configured to supply power, which adopts a high-voltage DC power supply.

(3) A data collection module, configured to collect a current value between the off-site emitting electrode and each of the intra-site receiving electrodes respectively, and determine a maximum current value point Mn of the solid waste pile surface and a maximum current value An.

The operating mode of the data collection module adopts the processes of step S102 to step S104 in Embodiment 1.

A data measurement module, configured to select an off-site point So2, and measure a current value between the off-site emitting electrode and the point So2 as a reference current Ab under the same power supply condition.

The operating mode of the data measurement module adopts the process of step S105 in Embodiment 1.

A data processing module, configured to determine a leakage status of the solid waste land disposal facility based on a ratio of the maximum current value An to the reference current Ab.

The operating mode of the data processing module adopts the process of step S106 in Embodiment 1.

Figure 5:
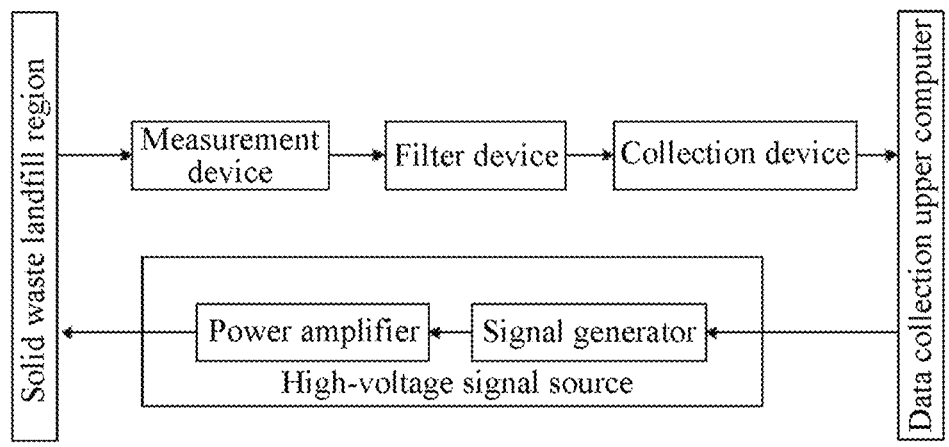
FIG. 5 is a schematic diagram of a data processing process according to an embodiment of the present invention.

Referring to FIG. 5, the entire processing process for data includes:

An upper computer controls a signal output device to input a high-voltage excitation signal to a solid landfill region, and the signal output device includes a signal generator and a power amplifier which are connected in sequence. A data collection device collects a current signal, since the landfill region is generally located in a relatively open field, there may be a large amount of industrial frequency noise, and a signal needs to be filtered before being collected. After the collection is finished, the upper computer processes collected current data.

Figure 6:
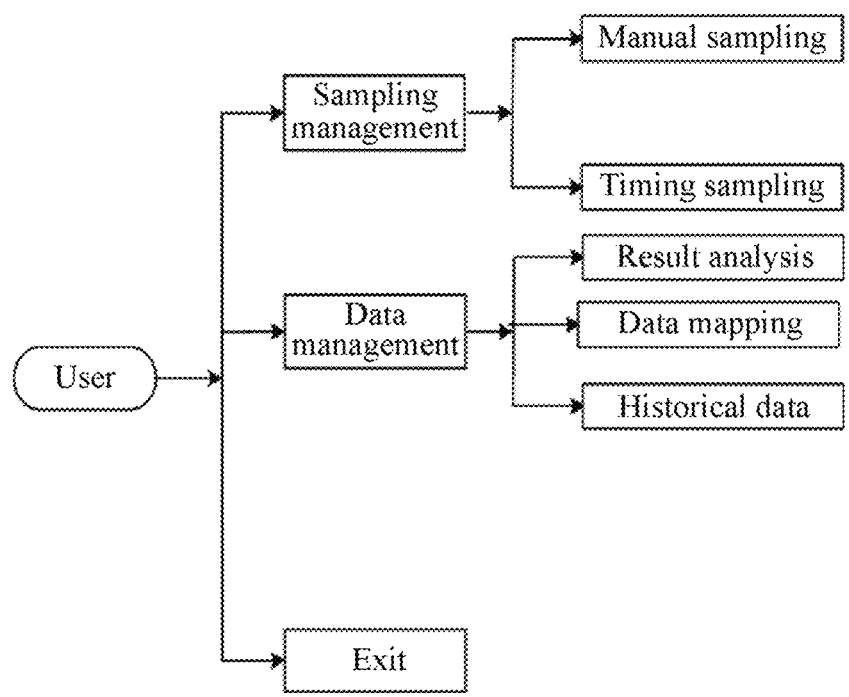
FIG. 6 is a schematic functional diagram of an upper computer according to an embodiment of the present invention.

Referring to FIG. 6, the upper computer mainly includes two parts: sampling management and data management. The sampling management includes manual sampling and timing sampling. When multiple times of data collection are needed in the same region, a plurality of sampling times may be set through timing sampling, and the system automatically executes a sampling function according to different sampling times, without manual intervention. The data management includes three parts: result analysis, data mapping, and historical data query. The result analysis is to interpolate sampled data, calculate coordinates of a maximum current value point, and analyze the degree of leakage. In order to observe the leakage status of the landfill region more intuitively, sampled historical data of the same region at different times may be selected. A three-dimensional map of the landfill region is drawn through spatial interpolation to restore real site information, and the site situation is observed through information in the map.

Embodiment 3

In one or more implementations, a terminal device is provided, including a server. The server includes a memory, a processor, and a computer program stored in the memory and capable of being run on the processor, and the processor, when executing the program, implements the method and the system for leakage status evaluation and leaks location of a solid waste land disposal facility in Embodiment 1. For brevity, details are not described herein again.

It should be understood that in this embodiment, the processor may be a central processing unit (CPU); or the processor may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general-purpose processor may be a microprocessor, or the processor may be any conventional processor and the like.

The memory may include a read-only memory and a random-access memory, and provide an instruction and data to the processor. A part of the memory may further include a non-volatile random-access memory. For example, the memory may further store information about a device type.

During implementation, the steps of the foregoing method may be completed through an integrated logic circuit of hardware or an instruction in the form of software in the processor.

The method for leakage status evaluation and leaks location of a solid waste land disposal facility in Embodiment 1 may be directly implemented by a hardware processor, or implemented by a combination of hardware and software modules in the processor. The software module may be located in a mature storage medium in the field such as a random access memory, a flash memory, a read-only memory, a programmable read-only memory, an electrically erasable programmable memory, or a register. The storage medium is located in the memory. The processor reads information in the memory and completes the steps of the foregoing methods in combination with hardware thereof. To avoid repetition, details are not described herein again.

A person of ordinary skill in the art may notice that the exemplary units and algorithm steps described with reference to this embodiment can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. A method for leakage status evaluation and leaks location of a solid waste land disposal facility, the method comprising:
    arranging an off-site emitting electrode for the solid waste land disposal facility, and arranging a plurality of intra-site receiving electrodes on a solid waste pile surface in a grid shape;
    selecting a power supply to supply power, collecting a current value between the off-site emitting electrode and each of the intra-site receiving electrodes respectively, and determining a maximum current value point Mn of the solid waste pile surface and a maximum current value An;
    selecting an off-site point So2, and measuring a current value between the off-site emitting electrode and the off-site point So2 as a reference current Ab under the same power supply condition; and
    determining a leakage status of the solid waste land disposal facility based on a ratio of the maximum current value An to the reference current Ab.

2. The method for leakage status evaluation and leaks location of a solid waste land disposal facility according to claim 1, wherein if there is a leakage in the solid waste land disposal facility, a position of the maximum current value point Mn is a damaged position.

3. The method for leakage status evaluation and leaks location of a solid waste land disposal facility according to claim 1, wherein the selecting a power supply to supply power and collecting a current value between the off-site emitting electrode and each of the intra-site receiving electrodes respectively specifically comprises:
    connecting two ends of the power supply to an off-site electrode and a first intra-site electrode respectively, and collecting a current I11; and
    keeping the end of the power supply connected to the off-site electrode fixed, connecting the other end of the power supply to other intra-site electrodes in sequence respectively, and collecting corresponding current values respectively.

4. The method for leakage status evaluation and leaks location of a solid waste land disposal facility according to claim 1, wherein the method of determining a maximum current value point Mn of the solid waste pile surface and a maximum current value An comprises:
    (i) collecting the current value between the off-site emitting electrode and each of the intra-site receiving electrodes respectively, and determining a region where a maximum current value point AMAX1 is located;
    (ii) arranging a plurality of receiving electrodes in a grid shape again in the region where the maximum current value point Mn is located, and determining a maximum current value point AMAX2, a grid spacing of a present arrangement being smaller than a grid spacing of a previous arrangement;
    (iii) determining whether a distance between the maximum current value point AMAX1 and the maximum current value point AMAX2 is smaller than a set value, wherein
    when the distance between the maximum current value point AMAX1 and the maximum current value point AMAX2 is smaller than the set value, recording a final maximum current value, and
    when the distance between the maximum current value point AMAX1 and the maximum current value point AMAX2 is not smaller than the set value, arranging a plurality of receiving electrodes in a grid shape again in a region where the maximum current value point AMAX2 is located, and determining a maximum current value point AMAX3, the grid spacing of the present arrangement being smaller than grid spacing of the previous arrangement; and (iv) determining whether a distance between the maximum current value point AMAX3 and the maximum current value point AMAX2 is smaller than the set value, wherein when the distance between the maximum current value point AMAX3 and the maximum current value point AMAX2 is smaller than the set value, recording a final maximum current value, and when the distance between the maximum current value point AMAX3 and the maximum current value point AMAX2 is not smaller than the set value, repeating steps (i)-(iv) until a distance between AMAXn and AMAXn−1 is smaller than the set value.

5. The method for leakage status evaluation and leaks location of a solid waste land disposal facility according to claim 4, wherein determining the region where the maximum current value point AMAX1 is located comprises:

positioning intra-site electrodes to obtain x and y coordinates of each electrode, interpolating a current value of each electrode to obtain a plane contour map of the current value, and determining the maximum current value point AMAX1 according to the plane contour map of the current value.

6. The method for leakage status evaluation and leaks location of a solid waste land disposal facility according to claim 1, wherein the method of selecting an off-site point So2 and measuring a current value between the off-site emitting electrode and the off-site point So2 as a reference current Ab under the same power supply condition comprises:

measuring a horizontal distance d between a final maximum current value point and an off-site emitting electrode So1;

taking the off-site emitting electrode So1 as a starting point, and extending the horizontal distance d along a direction of a connecting line between the final maximum current value point and the off-site emitting electrode So1 to obtain a point So2; and connecting two ends of the power supply to So1 and So2 respectively, and measuring the current after power supplying, as a reference current value Ab.

7. The method for leakage status evaluation and leaks location of a solid waste land disposal facility according to claim 1, wherein a first ratio of the maximum current value An to the reference current Ab is an indicator of integrity of an impermeable layer, and the closer the first ratio is to 0, the better the integrity;

a second ratio of the maximum current value An to the reference current Ab is an indicator that the impermeable layer has damage and leakage having a first level of severity, the second ratio being greater than the first ratio; and a third ratio of the maximum current value An to the reference current Ab being greater than 1 is an indicator that damage of the impermeable layer has a second level of severity resulting in leachate leakage, the third ratio being greater than the second ratio, and the second level of severity being more severe than the first level of severity.

8. A terminal device, comprising:

a processor configured to implement a plurality of instructions, and a computer readable storage medium configured to store the plurality of instructions, wherein the instructions are adapted to be loaded by the processor and to perform the method for leakage status evaluation and leaks location of a solid waste land disposal facility according to claim 1.

9. A non-transitory computer readable storage medium, having a plurality of instructions stored therein, wherein the instructions are adapted to be loaded by a processor of a terminal device and to perform the method for leakage status evaluation and leaks location of a solid waste land disposal facility according to claim 1.

* * * * *